United States Patent [19]

Lincoln

[11] Patent Number: 5,009,482
[45] Date of Patent: Apr. 23, 1991

[54] METHOD AND APPARATUS FOR FABRICATING A PIGTAILED LENS ASSEMBLY

[75] Inventor: Thomas C. Lincoln, South Pasadena, Calif.

[73] Assignee: Microdot Inc., Chicago, Ill.

[21] Appl. No.: 411,919

[22] Filed: Sep. 25, 1989

[51] Int. Cl.$^5$ .............................................. G02B 6/32
[52] U.S. Cl. ................................. 350/96.18; 350/320
[58] Field of Search ............... 350/96.15, 96.18, 96.20, 350/320

[56] References Cited

U.S. PATENT DOCUMENTS

| 4,269,648 | 5/1981 | Dakss et al. | 350/96.18 X |
| 4,647,331 | 3/1987 | Koury, Jr. et al. | 350/96.18 X |
| 4,678,268 | 7/1987 | Russo et al. | 350/96.18 |
| 4,743,283 | 5/1988 | Borsuk | 350/96.18 X |

OTHER PUBLICATIONS

D'Auria et al., "High Index Microlenses for GaAlAs Laser-Fibre Coupling", *Electronics Lett.*, vol. 16, No. 9, Apr. 1980, pp. 322-324.

*Primary Examiner*—John D. Lee
*Attorney, Agent, or Firm*—Lyon & Delevie

[57] ABSTRACT

A method and apparatus for fabricating pigtailed lens assemblies employing iterative micropositioning and empirical means to accurately align an optical fiber with an axis of a spherical lens at the focal point thereof, whereupon the fiber is fused to the lens by a laser beam directed through the lens along the alignment axis.

12 Claims, 1 Drawing Sheet

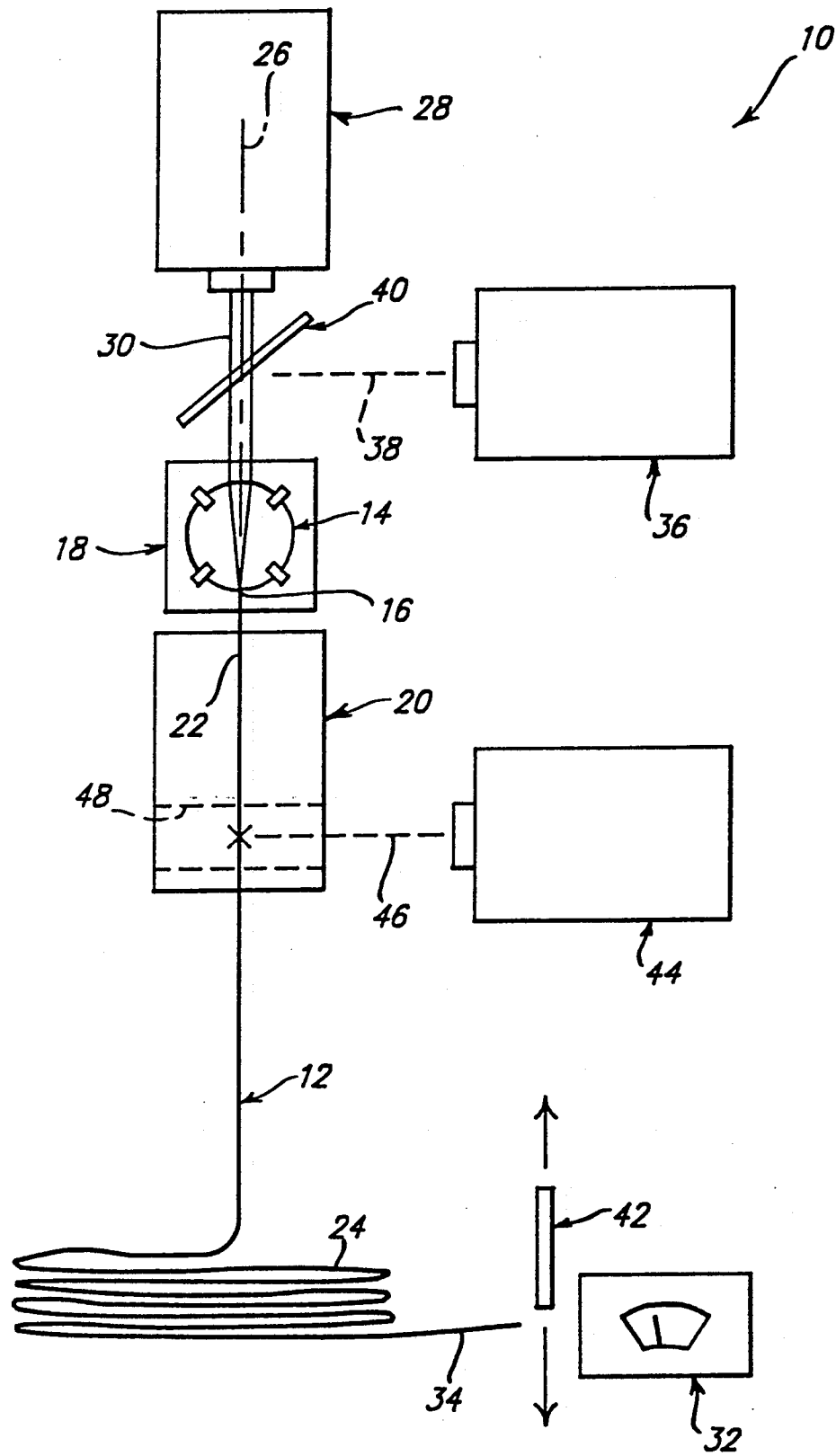

METHOD AND APPARATUS FOR FABRICATING A PIGTAILED LENS ASSEMBLY

BACKGROUND OF THE INVENTION

The instant invention relates to methods and apparatus for accurately aligning a length of optical fiber along an optical axis of a spherical lens, whereafter the lens and fiber are joined together to provide a pigtailed lens assembly for a fiber optic cable.

The prior art teaches iterative micropositioning of the end of an optical fiber relative to the focal point of a lens to achieve a collimated light beam whereupon the fiber is bonded to the lens with a suitable adhesive. For example, U.S. Pat. No. 4,509,827 to Cowen et al. and U.S. Pat. No. 4,545,643 to Young et al. teach methods for fabricating fiber optic connectors having an optical fiber abutting a graduated refractive index (GRIN) rod lens wherein a mirrored surface is positioned substantially orthogonally relative to the axis of the lens in order to autocollimate a light beam transmitted therethrough. A light beam is thereafter transmitted through the fiber, and the fiber is iteratively micropositioned relative to the lens until the returning light signal is maximized. The fiber is then secured to the lens as by potting the abutting end thereof in a suitable adhesive. Accuracy is thus dependent on proper calibration of the mirrored surface, which calibration may be disturbed in the potting process.

Similarly, U.S. Pat. No. 4,637,683 to Asawa teaches a method for aligning optical fiber connectors wherein an optical fiber is iteratively micropositioned relative to one end of a GRIN lens so as to maximize the reflection of light emanating from the fiber back from the opposite end of the lens. Significantly, the method requires a coating step to create the reflective surface on the opposite end of the lens, which is introduced into the optical path, as well as the creation of a reference plane to ensure a proper angle of incidence for light rays.

Alternatively, the prior art teaches the use of special lens assemblies which facilitate the alignment of optical fibers therewith. For example, U.S. Pat. No. 4,666,238 to Borsuk et al teaches a lens assembly having a rearward extension for aligning and retaining the end of an optical fiber at the focal point thereof. Borsuk et al thus necessitates the use of specialized lens assemblies requiring strict manufacturing tolerances for successful alignment of the fiber with the focal point of the lens. Still further, the Borsuk method fails to provide convenient means for checking the coupling efficiency achieved between the fiber and lens, and the improper bonding of the fiber to the lens will result in the discarding of a part (the lens) for which much cost has already been incurred.

Thus, the prior art teaches methods for bonding an optical fiber to a lens involving complex reflection schemes which are critically dependent upon the proper calibration of reference surfaces or planes to achieve proper fiber/lens alignment, which calibration may be jeopardized during the joining stage as when applying adhesive between the fiber and the lens. Alternatively, the prior art teaches the use of costly specialized lens assemblies to facilitate the alignment and joining of an optical fiber to the focal point of a lens. It is further noted that, where a pigtailed lens assembly employing a spherical lens is desired, the prior art fails to provide means for rotationally manipulating the lens prior to joining an optical fiber therewith so as to maximize coupling efficiency should the lens have a crystal structure which provides a unique optical axis of maximum transmissivity. Finally, prior art methods for fabricating pigtailed lens assemblies fail to provide convenient means for testing the coupling efficiency achieved between the fiber and lens thereof immediately subsequent to the joining of the fiber and lens.

SUMMARY OF THE INVENTION

It is an object of the instant invention to provide a method and apparatus for joining a length of optical fiber with a spherical lens at the focal point thereof without requiring the calibration of reference planes therefor.

It is also an object of the instant invention to provide a method and apparatus for accurately aligning an optical fiber with a spherical lens having a unique optical axis of maximum transmissivity due to its crystal structure.

A further object of the instant invention is to provide a method and apparatus for fabricating pigtailed lens assemblies which permits the immediate testing thereof.

The instant apparatus for joining a length of optical fiber with a spherical lens at the focal point of the latter comprises a lens retainer; a first laser for directing a low intensity light beam through the lens along a first axis thereof; a fiber chuck for positioning the bitter end of a coil of optical fiber into contiguity with the lens and collinear with the first axis thereof; a light detector, such as an optical power meter, coupled to the fiber cable for detecting the amount of light that is directed by the lens thereinto; and a second laser for directing a high intensity light beam along the first axis of the lens to fuse the fiber to the lens subsequent to the alignment of the fiber with the first axis thereof. Where desired, the first and second lasers may be replaced by a single, variable-output laser, thereby obviating the need for collinearizing the outputs of the two discrete lasers.

The method of the instant invention comprises the steps of directing a low intensity light beam along a first axis of a spherical lens; positioning an optical fiber proximate with the lens and substantially collinear with the first axis of the lens, whereby a portion of the low intensity light beam is directed by the lens into the fiber; detecting the amount of light directed by the lens into the fiber; iteratively micropositioning the fiber relative to the lens to place the fiber in contiguity therewith and to maximize the detected amount of light directed by the lens into the fiber; and directing a high intensity light beam along the first axis of the lens to fuse the fiber to the lens. Under the instant method, the lens is also rotationally manipulated prior to the fusing of the fiber therewith so as to maximize the transmission of the low intensity light beam through the lens.

The invention thus provides for the joining of the fiber to the spherical lens without disturbing the fiber/lens alignment and without the need for calibrated reference planes. Subsequent to the fusing together of the fiber and lens, the low intensity beam is once again directed through the lens along the first axis thereof. In this manner, the instant method allows for the immediate testing of the assembled pigtailed lens assembly and, hence, the prompt rejection of deficient assemblies.

Where the fiber is to be cut to length from a coil thereof, the instant method further comprises the step of cutting the optical fiber to a predetermined length subsequent to fusing the fiber to the lens so as to form pigtailed lens assemblies with splice-ready ends for use as assemblies in fiber optic termini. For example, in the preferred embodiment, a second high intensity beam is directed at the fiber at a point thereon axially removed from the junction formed between the fiber and the lens. The cutting step further serves to provide the remaining length of fiber with a precision cut end ideal for joining with the next spherical lens subsequent to the indexing of the fiber in the chuck. The instant method also comprises the step of coating of the lens assembly after fusing the fiber to the lens.

BRIEF DESCRIPTION OF THE DRAWING

The drawing is a diagrammatic schematic of an exemplary embodiment of the apparatus of the instant invention when operating the alignment laser thereof.

DETAILED DESCRIPTION OF THE PREFERRED EMBODIMENT OF THE INVENTION

Referring to the drawing, an exemplary embodiment 10 of the apparatus of the instant invention for joining a length of optical fiber 12 to a spherical lens 14 at its focal point 16 comprises a retainer 18 adapted to receive the lens 14 and an optical fiber chuck 20 adapted to receive a first end 22 of a coil 24 of the optical fiber 12. The lens retainer 18 is constructed so as to allow a light beam to pass through the lens 14 along a first axis 26 thereof. The fiber chuck 20 permits the three dimensional positioning of the end 22 of the fiber 12 relative to the retained lens 14. More specifically, the end 22 of the fiber 12 is mounted in the fiber chuck 20 and positioned in a relatively coarse manner into proximity with the spherical lens 14 and substantially collinear with the first axis 26 thereof. An alignment laser 28 directs a low intensity light beam 30 into the lens 14 along the first axis 26 thereof. A portion of the light beam 30 is directed by the lens 14 into the end 22 of the fiber 12. An optical power meter 32 is optically coupled to the fiber 12 at its other end 34. The power meter 32 detects the amount of light directed by the lens 14 into the fiber 12 by detecting the amount of light transmitted through the fiber coil 24 and out the other end 34 thereof.

The optical fiber 12 is iteratively micropositioned relative to the retained lens 14 through the manipulation of fine spatial adjustment controls (not shown) on the fiber chuck 20 so as to be placed in contiguity with the lens 14 and the reading from the optical power meter 32 is maximized, i.e., until the end 22 of the fiber 12 is aligned with the first axis 26 of the lens 14. In accordance with another feature of the instant invention, the lens retainer 18 is capable of rotationally manipulating the lens 14 relative to the fiber 12 to expose alternate lens axes to the low intensity light beam 30 directed therethrough. In this manner, a lens 14 having a crystal structure providing a unique optical axis of maximum light transmissivity is oriented so as to maximize the coupling efficiency of the resulting pigtailed lens assembly.

When the fiber 12 is accurately aligned with the lens 14, a pulse laser 36 directs a high intensity light beam 38 along the same path as the low intensity beam 30, i.e., through the lens 14 along the first axis 26 thereof. More specifically, the high intensity beam 38 is directed along the first axis 26 of the lens 14 through the use of directional optics, such as mirror element 40, to guide the high intensity beam 38 from the pulse laser 36 along the first axis 26 of the lens 14 so as to be collinear with the low intensity beam 30 generated by the alignment laser 28. Alternatively, the requisite high intensity beam 36 is obtained through a controlled power increase of the alignment laser 28. A shutter 42 on the power meter 32 is closed prior to directing the high intensity signal 34 through the lens 14 in order to decouple the power meter 32 from the fiber 12 and prevent damage to the power meter 32.

The lens 14 acts to focus the high intensity beam 38 on the focal point 16 of the lens 14 which, in turn, causes the fiber 12 to fuse to the lens 14 at the junction point therebetween. In this regard, it is noted that the focal point of the lens is preferably on or very near the surface of the lens 14. For a spherical lens such as that employed with the instant invention, an index of refraction equal to 2 places the focal point on the surface of the lens 14, and an index of refraction slightly lower than 2 shifts the focal point thereof to a point outside of the sphere. Thus, under the instant invention, a lens with refractive index of slightly less than 2 is preferred as having focusing properties sufficient to realize the fusion of fiber 12 to the lens 14.

The instant method further provides for the immediate testing of the coupling efficiency of the resulting fiber/lens assembly by once again directing the low intensity beam 30 along the first axis 26 of the lens 14, opening the shutter 42 on the power meter 32, and verifying the prior maximum reading from the meter 32.

A cutting laser 44 then generates a second high intensity light beam 46 to cut the fiber 12 to a predetermined length as measured from the junction between the fiber 12 and the lens 14 to obtain a pigtailed lens assembly having an end suitable for splicing into an optical fiber system. Referring to the drawing, the second high intensity beam 46 is directed at the fiber 12 through an opening 48 in the fiber chuck 20 which supports the fiber 12 in a manner so as to maintain appropriate tension for cutting. The lens 14 may then be optically coated to further improve the transmission characteristics of the pigtailed assembly prior to its use as a terminal connector. The fiber 12 is then ready for advancement within the chuck 20 allowing assembly with the next lens 14.

While the preferred embodiment of the invention has been disclosed, it should be appreciated that the invention is susceptible of modification without departing from the spirit of the invention or the scope of the subjoined claims.

I claim:

1. An apparatus for joining an optical fiber to a spherical lens comprising
    means for retaining said spherical lens so as to allow a light beam to pass through said lens along a first axis thereof;
    means for directing a low intensity light beam through said lens along said first axis thereof;
    means for micropositioning an end of said optical fiber in contiguity with said lens and colinear with said first axis thereof, whereby said low intensity beam is directed into said optical fiber by said lens;
    means optically coupled with said fiber for detecting the amount of said low intensity beam directed into said fiber by said lens; and
    means for directing a high intensity light beam through said lens along said first axis thereof, the intensity of said high intensity beam as focused by said lens being sufficient to fuse said fiber to said lens.

2. The apparatus of claim 1 wherein said means for detecting the amount of said low intensity beam directed into said fiber by said lens comprises an optical power meter coupled with said fiber at the second end thereof.

3. The apparatus of claim 2 including shutter means for optically decoupling said fiber from said power meter.

4. The apparatus of claim 1 wherein said means for directing said low intensity beam through said lens and said means for directing said high intensity beam through said lens comprises a laser operative to generate a light beam, and means for adjusting the intensity of the light beam generated by said laser.

5. The apparatus of claim 1 wherein said means for directing said low intensity beam through said lens comprises
   a first laser for generating said low intensity beam: and
   means for guiding said low intensity beam along said first axis of said lens;
and wherein said means for directing said high intensity beam through said lens comprises
   a second laser for generating said high intensity beam; and
   means for guiding said high intensity beam along said first axis of said lens.

6. The apparatus of claim 1 wherein said means for retaining said spherical lens further comprises means for rotationally manipulating said lens.

7. The apparatus of claim 1 further comprising means for directing a second high intensity beam at said fiber at a point thereon axially removed from the junction formed between said fiber and said lens, whereby said fiber is cut to a predetermined length.

8. A method for joining an optical fiber to a spherical lens along an optical axis of said lens comprising
   directing a low intensity light beam through said lens along a first axis thereof;
   positioning an end of said optical fiber proximate with said lens and substantially collinear with said first axis whereby a portion of said low intensity beam is directed by said lens into said optical fiber;
   detecting the amount of said low intensity beam directed into said optical fiber;
   micropositioning said optical fiber relative to said lens to maximize the detected amount of said low intensity beam and to place said fiber in contiguity with said lens; and
   directing a high intensity light beam along said first axis, said high intensity beam being focused by said lens to fuse said optical fiber to said lens.

9. The method according to claim 8 including the step of rotationally manipulating said lens to maximize the transmission of said low intensity beam therethrough.

10. The method according to claim 8 including the step of cutting said optical fiber to a predetermined length subsequent to fusing said optical fiber to said lens.

11. The method of claim 10 wherein said cutting step comprises the step of directing a second high intensity light beam at said fiber at a point thereon axially removed from the junction formed between said fiber and said lens.

12. The method according to claim 8 including the step of coating said lens subsequent to fusing said optical fiber thereto.

* * * * *